United States Patent [19]

Aymerich et al.

[11] Patent Number: 5,318,336
[45] Date of Patent: Jun. 7, 1994

[54] SUNVISOR FOR AUTOMOBILES

[75] Inventors: José Aymerich; Jesûs Prat, both of Rubi, Spain

[73] Assignee: Industrias Techno-Matic S.A., Barcelona, Spain

[21] Appl. No.: 924,013

[22] PCT Filed: Jan. 30, 1992

[86] PCT No.: PCT/ES92/00011
§ 371 Date: Sep. 18, 1992
§ 102(e) Date: Sep. 18, 1992

[87] PCT Pub. No.: WO92/14623
PCT Pub. Date: Sep. 3, 1992

[30] Foreign Application Priority Data

Feb. 14, 1991 [ES] Spain .................................. 9100391

[51] Int. Cl.$^5$ .............................................. B60J 3/02
[52] U.S. Cl. ................................. 296/97.5; 296/97.1; 296/97.12
[58] Field of Search ................... 296/97.1, 97.5, 97.9, 296/97.12, 97.13

[56] References Cited

U.S. PATENT DOCUMENTS

| 4,428,612 | 1/1984 | Viertel et al. | 296/97.12 |
| 4,773,699 | 9/1988 | Cebollero | 296/97.1 |
| 5,054,839 | 10/1991 | White et al. | 296/97.12 X |

Primary Examiner—David M. Mitchell
Assistant Examiner—Andrew C. Pike
Attorney, Agent, or Firm—Michael J. Striker

[57] ABSTRACT

A sunvisor for automobiles has the following elements. A one-piece casing composed of a plastic material. A retaining spring has a housing for retaining a pivot pin of a support attached to an automobile structure, so that the retaining ring may snugly rotate about the pin. The retaining spring and the pivot pin have mechanical means allowing a rest position of the sunvisor to be set. A hanging bridge is engageable with a support attached to the automobile structure and an external covering is formed as a sheath. The retaining spring is a one-piece member and is arranged in an interior of the casing totally covered by he casing and held firmly in a required position. The retaining spring is accessible from outside of the casing through a single orifice formed in the casing so that it may snugly slide for coupling with a pivot pin of the bent support attached to the automobile structure. The casing has an inner volume which, with the exception of a space occupied by the retaining spring, is completely full with a plastic material so as to form a structural reinforcement of the casing. The casing is formed, close to an end opposite to a position occupied by the retaining spring, with a through aperture defining a hanging bridge which can be snugly rotatably coupled to the support.

9 Claims, 2 Drawing Sheets

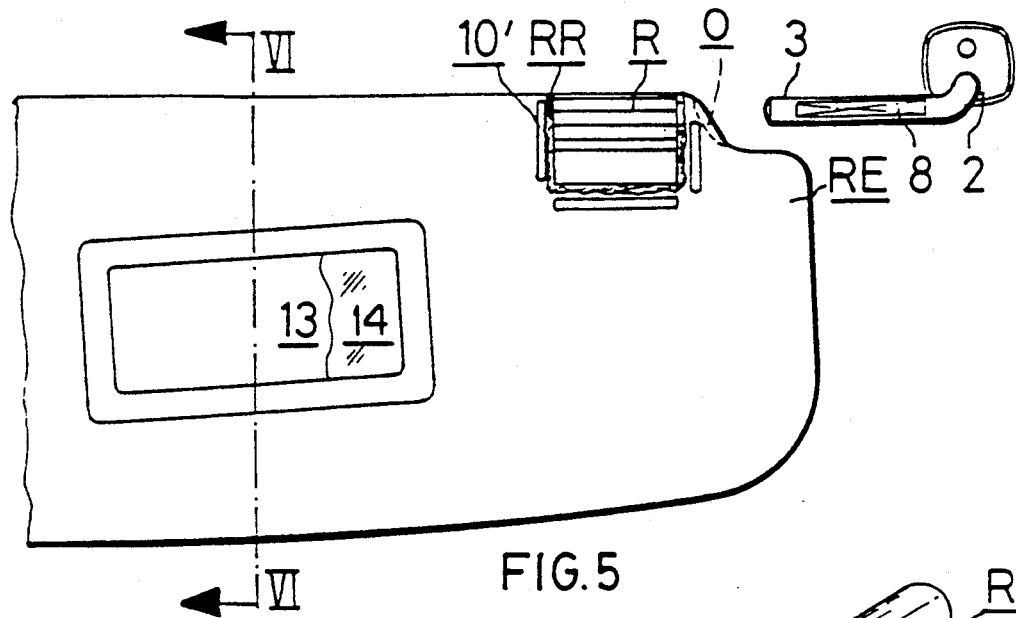
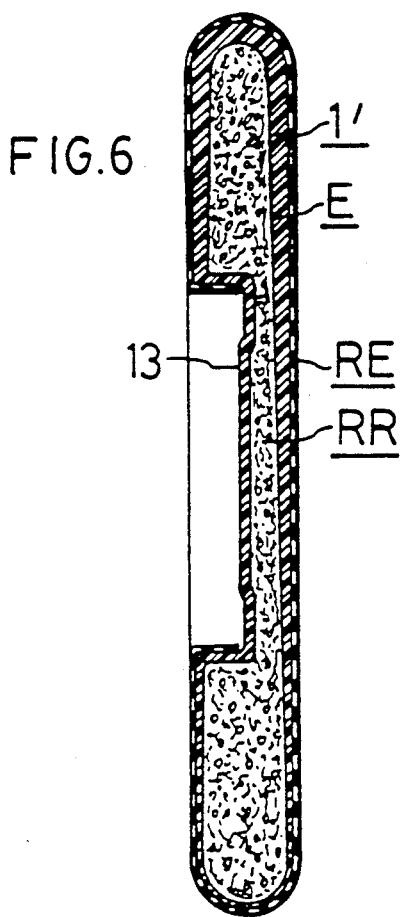
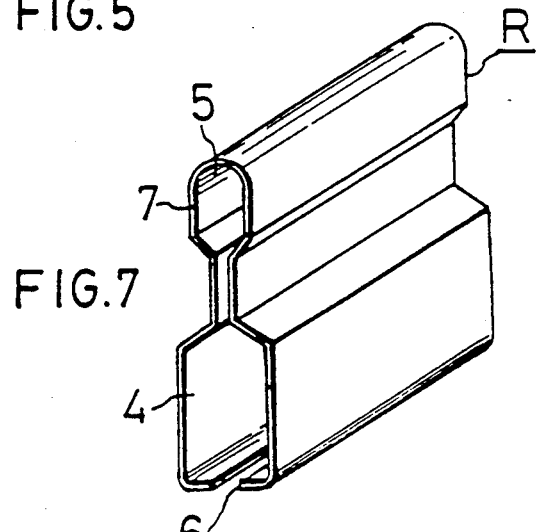
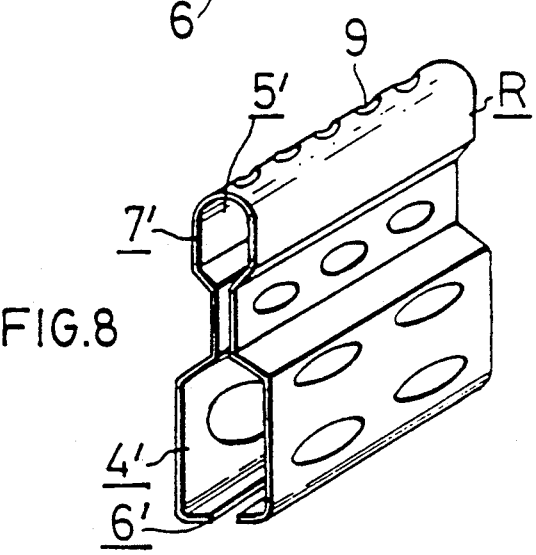
FIG.5
FIG.6
FIG.7
FIG.8

SUNVISOR FOR AUTOMOBILES

BACKGROUND OF THE INVENTION

The present invention relates to a sunvisor for automobiles.

More particularly, the present invention relates to sunvisors which are formed on an integral plastics material casing.

Sunvisors comprising a structure based on a plastics materials casing formed by blow molding of these materials are known. These sunvisors have a contour adapted to the configuration of the vehicle passenger compartment and may comprise the so-called vanity mirror, normally arranged in the passenger side sunvisor and superimposed on the surface of said sunvisor or mounted in the body thereof.

Sunvisors comprise a retaining spring which is generally formed from high spring steel and may be attached to the corresponding pivot pin of the bent support attached to the automobile structure. With this coupling, the sunvisor may rotate about itself and about the bent support and occupy, among the positions of regular use, any position defined by the user. The retaining spring grips the pivot pin so as to ensure, under normal conditions of use, that the sunvisor position selected by the user position is not modified by the vibrations caused by the vehicle running. In the majority of known embodiments, the said retaining spring and bent support pivot pin are provided, also, with means for holding the sunvisor in at least one position generally the rest position, with greater force.

Sunvisors are normally known to comprise a hanging bridge which is arranged at the opposite end to the one occupied by the retaining spring. This hanging bridge may be coupled to a support arranged on the automobile structure for providing the sunvisor with an auxiliary point of support, once the hanging bridge is hooked onto the support. This prevents mechanical overloads which the coupling of the sunvisor to the bent support would otherwise have to withstand.

The known sunvisors comprising a casing formed by blow molding of plastics materials have the drawback, derived from the very nature of the said casing, of a limited mechanical strength. Thereby, under normal conditions of use, they are easily deformable. A further drawback is that the retaining spring and/or the hanging bridge require to be incorporated in the sunvisor after the casing thereof has been formed, involving the need of using additional assembly members and operations.

The above drawbacks have a notable effect with regard, on the one hand, to the operative reliability of these sunvisors, particularly since the large number of components thereof imply a greater number of faults and/or breakages and, on the other hand, to the incorporation of the retaining spring and/or hanging bridge, during the corresponding assembly stages, to the sunvisor casing, which makes the production process and, therefore, the finished product, notably more expensive.

SUMMARY OF THE INVENTION

Accordingly, it is an object of the present invention to provide a sunvisor for automobiles, which avoids the disadvantages of the prior art.

In keeping with these objects and with others which will become apparent hereinafter, one feature of the present invention resides, briefly stated, in a sunvisor for automobiles which has a one-piece casing composed of a plastic material. A retaining spring has a housing for retaining a pivot pin of a support attached to an automobile structure, so that the retaining ring may snugly rotate about the pin. The retaining spring and the pivot pin have mechanical means allowing a rest position of the sunvisor to be set. A hanging bridge is engageable with a support attached to the automobile structure. An external covering is formed as a sheath. The retaining spring is a one-piece member and is arranged in an interior of the casing totally covered by the casing and held firmly in a required position. The retaining spring is accessible from outside of the casing through a single orifice formed in the casing so that it may snugly slide for coupling with a pivot pin of the bent support attached to the automobile structure. The casing has an inner volume which, with the exception of a space occupied by the retaining spring, is completely full with a plastic material so as to form a structural reinforcement of the casing. The casing is formed, close to an end opposite to a position occupied by the retaining spring, with a through aperture defining a hanging bridge which can be snugly rotatably coupled to the support.

The sunvisor for automobiles of the invention comprises the following known member:

an essentially prismatic one-piece casing of variable contour depending o the needs arising from the internal configuration of the vehicle passenger compartment, which casing, which may include any type of additional device, such as may be a mirror, is made from plastics materials, preferably polythene, and formed by a blow process;

a retaining spring, made preferably from high spring steel, in which there is defined a housing firmly retaining the pivot pin of the bent support attached to the automobile structure so that said retaining spring may snugly rotate about said pin, said retaining spring and pivot pin having corresponding mechanical means allowing the rest position of the sunvisor to be set;

a hanging bridge which may be engaged with the corresponding support attached to the vehicle structure;

and, an external covering, preferably made from polyvinyl chloride or textile materials, as a sheath and which confers a finish in keeping with the finish of the vehicle passenger compartment on the sunvisor.

In accordance with new features of the present invention, the retaining spring, which is one-piece, is arranged in the interior of the casing, totally covered thereby and held firmly in position by retaining means formed in the casing itself, said retaining spring being accessible from the outside of the casing by a single orifice formed therein and through which it may snugly slide for coupling with the pivot pin of the bent support attached to the vehicle structure;

the inner volume of the casing, with the exception of the space occupied by the retaining spring is completely full of plastics materials, preferably polyolefins such as polythene, polypropylene or a mixture of both and also polyurethanes, forming the structural reinforcement of the casing;

and in that the casing is formed, close to the end opposite the position occupied by the retaining spring, with a through aperture defining a hanging bridge which may be snugly rotatably coupled to the support.

It is also a feature of the automobile sunvisor of the invention that the retaining means formed on the casing for setting therein the position occupied by the retaining spring consists of a plurality of recesses which on the front and rear faces thereof set the position occupied by the retaining spring.

The features of the automobile sunvisor of the invention described above solve the drawbacks of the known sunvisors structured on casing blow-molded from plastics materials.

The fact that the casing is shaped around the retaining spring in such way that the casing itself sets the position occupied by the retaining spring therein consequently eliminates any subsequent operation and/or additional element for fixing the spring to the casing as happens with the known sunvisors. This notably reduces the production costs.

The fact that the casing of the sunvisor of the invention is also formed with the hanging bridge which may engage the support attached to the vehicle structure also represents a notable reduction of the production costs. It does away with the need to incorporate said hanging bridge or any other additional assembly member in the sunvisor.

The fact that the casing of the sunvisor for automobiles of the invention is filled with plastics materials provides a very high mechanical strength on the sunvisor and, under normal conditions of use, prevents deformation and/or breakage thereof for mechanical overloads.

The recyclable nature of the polythene, the polypropylene or mixture of both used for making the casing, and the filling of the latter, of the sunvisor of the invention, prevents the sunvisor from contributing, as industrial refuse, to the degradation of the environment, at the end of the useful life thereof.

Furthermore, the said materials forming the casing, and the filling thereof, may optionally be subjected to a recycling process allowing the recovery of said materials and subsequent industrial application with the consequent reduction of costs as far as raw materials are concerned.

The novel features which are considered as characteristic for the invention ar set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a part front view of another embodiment of the sunvisor of the invention and the coupling thereof to a bent support.

FIG. 6 is a cross section view on the line VI—VI of FIG. 5.

FIG. 7 is a perspective view of the retaining spring of the sunvisor of the invention.

FIG. 8 is a perspective view of another embodiment of the retaining spring of the sunvisor of the invention.

DESCRIPTION OF THE PREFERRED EMBODIMENTS

The sunvisor for automobiles of the invention described as an embodiment comprises, as shown in FIGS. 1 to 4, the casing E., the hanging bridge P, the filling RR, the retaining spring R and the outer covering E.

FIGS. 1, 2, 3 and 4 show embodiment of the casing E, corresponding to those cases in which the sunvisor of the invention does not incorporate a vanity mirror.

Figure 4:
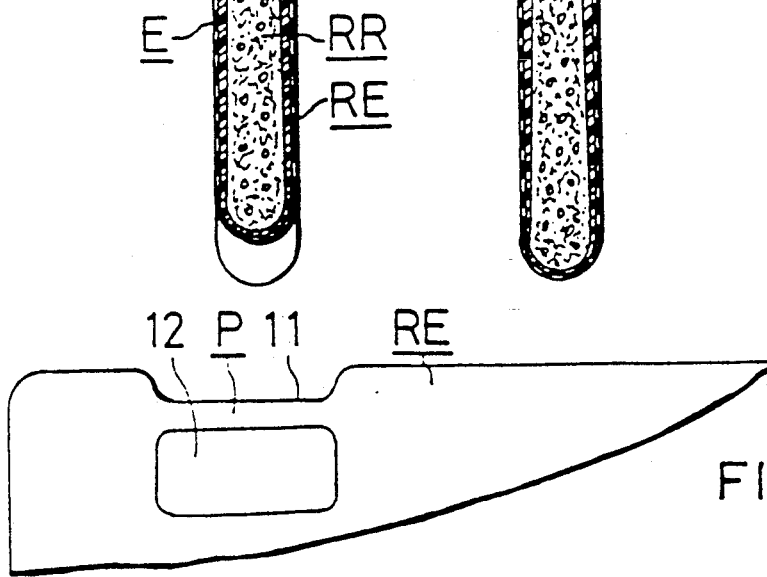
FIG. 4 is a part front view of the hanging bridge of the sunvisor of the invention.

FIGS. 4, 5 and 6 show another embodiment of the casing E, corresponding to those cases in which the sunvisor of the invention may incorporate a trough containing a vanity mirror and other items for increasing the functionality of the said mirror.

FIGS. 7 and 8 show two embodiments of the retaining spring R. Both embodiments have the same functions and are given as an example among other possible forms that said retaining spring R may adopt depending on the needs of each particular application.

Both embodiments of the casing and of the retaining spring of the sunvisor of the invention comprise equivalent members. For greater clarity of disclosure the same reference symbols are used for the members corresponding to the embodiment of the casing E shown in FIGS. 5 and 6 and to the retaining spring R shown in FIG. 8 being differentiated with the prime (') notation.

Figure 1:
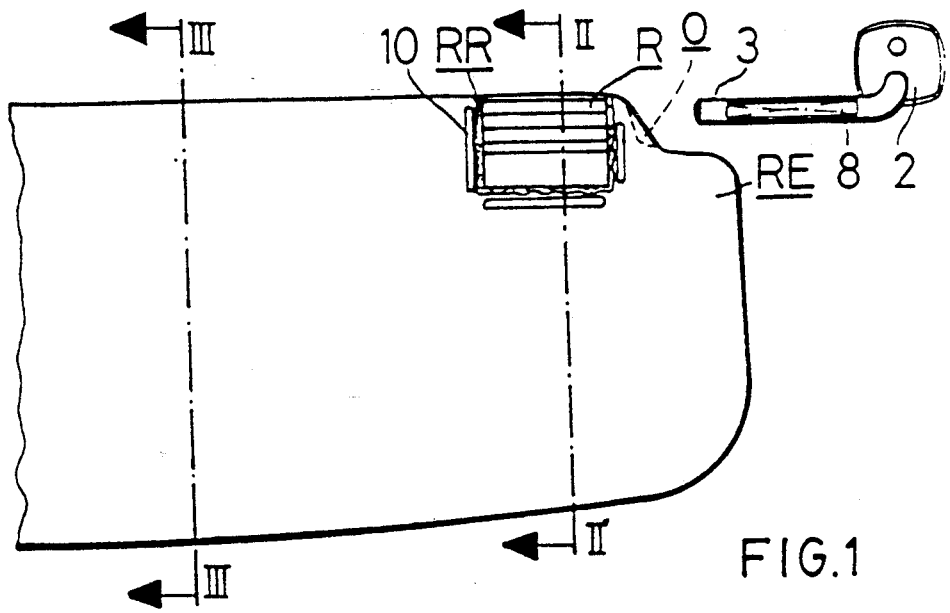
FIG. 1 is a part front view of the sunvisor of the invention and the coupling thereof to a bent support.
Figure 2:
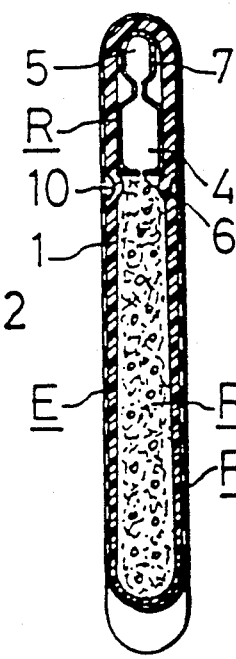
FIG. 2 is a cross section view on the line II—II of FIG. 1.

FIGS. 1 and 2 show how the casing E is essentially prismatic and is provided with a contour, given as an example, appropriate to the internal configuration of the vehicle passenger compartment. The casing E is made preferably from polythene and is formed by blow-molding process and has an orifice O through which the spring R is accessible.

Figure 3:
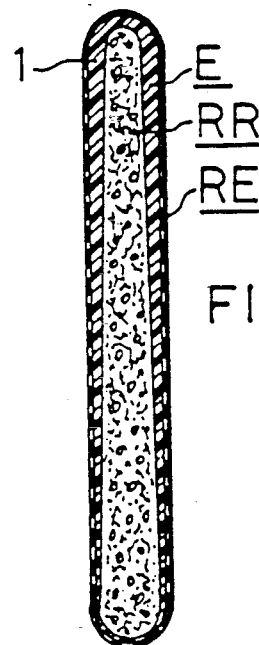
FIG. 3 is a cross section on the line III—III of FIG. 1.

The casing E, on both the front and the back side and all along the length thereof is formed with an internal thickening 1 with reference to the position of said casing E given in FIG. 1, the thickening progressively expands from the lower edge to reach a maximum thickness at the top edge thereof, as shown in FIGS. 2 and 3.

The thickening 1 acts as a structural reinforcement and helps to increase the mechanical strength of the casing E by avoiding the resilient deformation thereof under normal conditions of use.

FIGS. 1 and 2 show how the retaining spring R is located inside the casing E and is suitably arranged relative to the bent support 2 attached to the structure of the automobile. In order to obtain greater clarity of disclosure, the sunvisor of the invention is not coupled, by the pivot pin 3 to the bent support 2.

The casing E is formed by blow molding of polythene. This forming is effected about the retaining spring R, i.e., said retaining spring R is inserted in the blow mould prior to forming the casing E.

FIG. 7 shows how the retaining spring R is symmetrical about the longitudinal centre plane thereof. It is formed by a sheet of highly resilient material, preferably steel which, essentially, is formed by a lower prismatic portion 4 and by an upper semicylindrical portion 5.

The prismatic portion 4 of the retaining spring R is provided with a pressure slot 6 extending co-extensive with said spring R. By resilient deformation, said pressure slot 6 allows the surfaces of the retaining spring R in contact with the inner surface of the casing E to grip said surface so that they help to fix the position of the retaining spring R in the casing E, as shown in FIG. 2.

The semicylindrical portion 5 of the retaining spring R, which receives the pivot pin 3 of the bent support 2, is formed internally and longitudinally with two mutually opposite positioning flats 7. The flats are dimensioned in functional correspondence with the positioning flats 8 formed on said pivot pin 3, as shown in FIGS. 1 and 7.

The retaining spring R shown in FIG. 8 is formed, in a similar way to the embodiment of said spring R illustrated in FIG. 1. It has a lower prismatic portion 4', provided with a pressure slot 6' and an upper semicylindrical portion 5' which is provided internally and longitudinally with facing positioning flats 7'.

To aid in setting the position of the retaining spring R inside the casing E, the retaining spring R shown in FIG. 8 is provided with through holes 9, the number and arrangement of which, illustrated in said FIG. 8 as a guidance, will depend on the specific needs of each particular application.

The purpose of the said through holes 9 is to receive, during the molding stage of the casing E, part of the material forming the casing E. In this way once the casing E is formed, the material may aid to fix the position of the retaining spring R.

As shown in FIG. 1, the casing E is formed on both the front and rear sides with the retaining recesses 10 which hold the retaining spring R of the embodiment illustrated in FIG. 7. In this way, the recesses 10 prevent the retaining spring R from changing position within the casing E.

With a view to increasing the resistance of the casing E to deformation, it is provided with the filling RR formed, as said above, preferably by polyolefins such as polythene, polypropylene or a mixture of both or by polyurethanes. The filling RR full occupies the inner volume of the casing E except for the volume determined by the retaining spring R, as shown in FIG. 2.

FIG. 4 shows how, suitably arranged at the end occupied by the retaining spring R, the casing E is formed with the hanging bridge P which is defined by the cut-away portion 11 and by the through hole 12 formed in said casing E.

The corresponding bearing support, which is attached to the vehicle structure and which, for greater clarity of disclosure, has not been shown in the drawing sheets, may slide through said opening 12. In this way the hanging bridge P may engage said bearing support at will and rotate therearound.

FIGS. 4, 5 and 6 illustrate the embodiment of the sunvisor of the invention when, as said before, it may comprise a trough for containing a vanity mirror and the complementary elements thereto.

FIG. 6 shows how the casing E is formed internally thereof with the structural reinforcement thickening 1' and externally, as shown in FIG. 5, with the retaining recess 10' setting the position of the retaining spring R.

Suitably disposed on the front face thereof, the casing E is provided with the recess 13 defining a prismatic housing where the said trough containing a mirror surface 14 may be located and affixed.

The same as for the embodiment of the sunvisor of the invention illustrated in FIGS. 1, 2, 3 and 4, the casing E is provided with the filling formed by the aforesaid members, i.e. polyolefins such as polythene, polypropylene or a mixture of both or polyurethanes.

I the embodiments of the sunvisor of the invention shown in FIGS. 1, 2, 3 and 4 and in FIGS. 4, 5 and 6, the casing E is provided all over with the external covering RE formed preferably from polyvinyl chloride or textile materials. This covering RE, which forms a sheath, provides the sunvisor with a surface finish in keeping with the interior finish of the vehicle passenger compartment.

In both embodiments described of the sunvisor of the invention, the pivot pin 3 of the bent support 2 may be snugly inserted in the semicylindrical portion 5 or 5' of the retaining spring R through the opening formed for that purpose in the casing E, so that said retaining spring R and, consequently, the casing E to which it is firmly attached, may rotate about the pivot pin 3.

Under normal conditions of use, the retaining spring R uniformly and constantly grips the pivot pin 3. In order to obtain rotation of the sunvisor about the said pivot pin to situate it in the position of use selected by the user, it is necessary to apply a moment in excess of the grip of the retaining spring R. Its action is adequate to set the said position of use and prevent untimely movement of the sunvisor as a result of vibration caused by the normal running of the vehicle.

Furthermore, the joint action of the positioning flats 7 or 7' and 8 which, respectively, are formed on the retaining spring R and on the pivot pin 3 of the bent support 2 fix and more firmly ensure the contemplated rest position of the sunvisor of the invention.

It will be understood that each of the elements described above, or two or more together, may also find a useful application in other types of constructions differing from the types described above.

While the invention has been illustrated and described as embodied in a sunvisor for automobiles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A sunvisor for automobiles comprising a one-piece casing composed of a plastic material; a retaining spring having a housing for retaining a pivot pin of a support attached to an automobile structure, so that said retaining spring may snugly rotate about the pin, said retaining spring and the pivot pin having mechanical means allowing a rest position of the sunvisor to be set; a hanging bridge engageable with a support attached to the automobile structure; an external covering formed as a sheath, said retaining spring being a one-piece member and is arranged in an interior of said casing totally covered by said casing and held firmly in a required position, said retaining spring being accessible from outside of said casing through a single orifice formed in said casing so that it may snugly slide for coupling with a pivot pin of the support attached to the automobile structure, said casing having an inner volume which, with the exception of a space occupied by said retaining spring, being completed full with a plastic material so as to form a structural reinforcement of said casing, said casing being formed, close to an end opposite to a position occupied by said retaining spring, with a through aperture defining the hanging bridge which can be snugly rotatably coupled to the support; and retaining means formed in said casing for holding said retaining spring in a desired position, said retaining means including a plurality of recesses having front and rear faces for setting a position occupied by said retaining spring.

2. A sunvisor as defined in claim 1; and further comprising retaining means operative for firmly holding said retaining spring in said casing in a required position.

3. A sunvisor as defined in claim 1, wherein said one-piece casing has a substantially prismatic shape.

4. A sunvisor as defined in claim 1, wherein said casing is further provided with an additional device.

5. A sunvisor as defined in claim 4, wherein said additional device is a mirror.

6. A sunvisor as defined in claim 1, wherein said retaining spring is composed of high spring steel.

7. A sunvisor as defined in claim 1, wherein said external covering is composed of a material selected from the group consisting of polyvinyl chloride and a textile material.

8. A sunvisor as defined in claim 1, wherein said plastic material which fills said inner volume of said casing is a material selected rom the group consisting of a polyolefin and polyurethane.

9. A sunvisor as defined in claim 8, wherein said polyolefin is a material selected from the group consisting of polyethylene, polypropylene and a mixture of polyethylene and polypropylene.

* * * * *